United States Patent [19]

Cummins et al.

[11] Patent Number: 4,546,807
[45] Date of Patent: Oct. 15, 1985

[54] PASSENGER VEHICLE SPARE TIRE CONSTRUCTION

[75] Inventors: William T. Cummins, Mogadore; Wallace A. Lobdell, Canton, both of Ohio

[73] Assignee: Teledyne Industries Inc., Los Angeles, Calif.

[21] Appl. No.: 580,682

[22] Filed: Feb. 16, 1984

[51] Int. Cl.$^4$ ............................ B60B 9/10; B60B 9/12
[52] U.S. Cl. ............................................ 152/41; 152/49
[58] Field of Search .................. 152/40, 41, 44, 47–49, 152/17, 18, 6; 305/56, 57, 28

[56] References Cited

U.S. PATENT DOCUMENTS

| | | | |
|---|---|---|---|
| 1,032,863 | 7/1912 | Sanphy | 152/6 |
| 1,449,188 | 3/1923 | Patch | 152/41 |
| 1,455,180 | 5/1923 | Warner | 152/6 |
| 1,646,991 | 10/1927 | Chilton | 152/41 |
| 1,684,596 | 9/1928 | Patch | 152/41 |
| 2,294,818 | 9/1942 | Williams | 152/41 |
| 2,671,488 | 3/1954 | Christensen | 152/41 |
| 2,672,907 | 3/1954 | MacLean | 152/41 |

*Primary Examiner*—David A. Scherbel
*Assistant Examiner*—Mark J. Abate
*Attorney, Agent, or Firm*—Frease & Bishop

[57] ABSTRACT

A spare tire is provided for passenger autos to replace the usual fifth pneumatic tire and wheel assembly supplied as original equipment with autos. The tire includes a metal hub having an annular bulge to provide clearance for the brake calipers of an auto equipped with the tire. A series of rim segment assemblies with tread rubber thereon is mounted on the periphery of the hub member forming the tire rim. Each segment has a T-shaped metal member the T-stem of which is generally trapezoidal in shape and is vulcanized-bonded to a rubber block similar in shape which has an opposite surface vulcanized-bonded to a thin sheet metal segment. Each rim segment assembly is separately connected by suitable means to the hub member. A protective device guarding against tire collapse in event of failure of a bond between the rubber block and a metal member, engages the T-stem and hub member.

11 Claims, 9 Drawing Figures

U.S. Patent  Oct. 15, 1985  Sheet 1 of 2  4,546,807
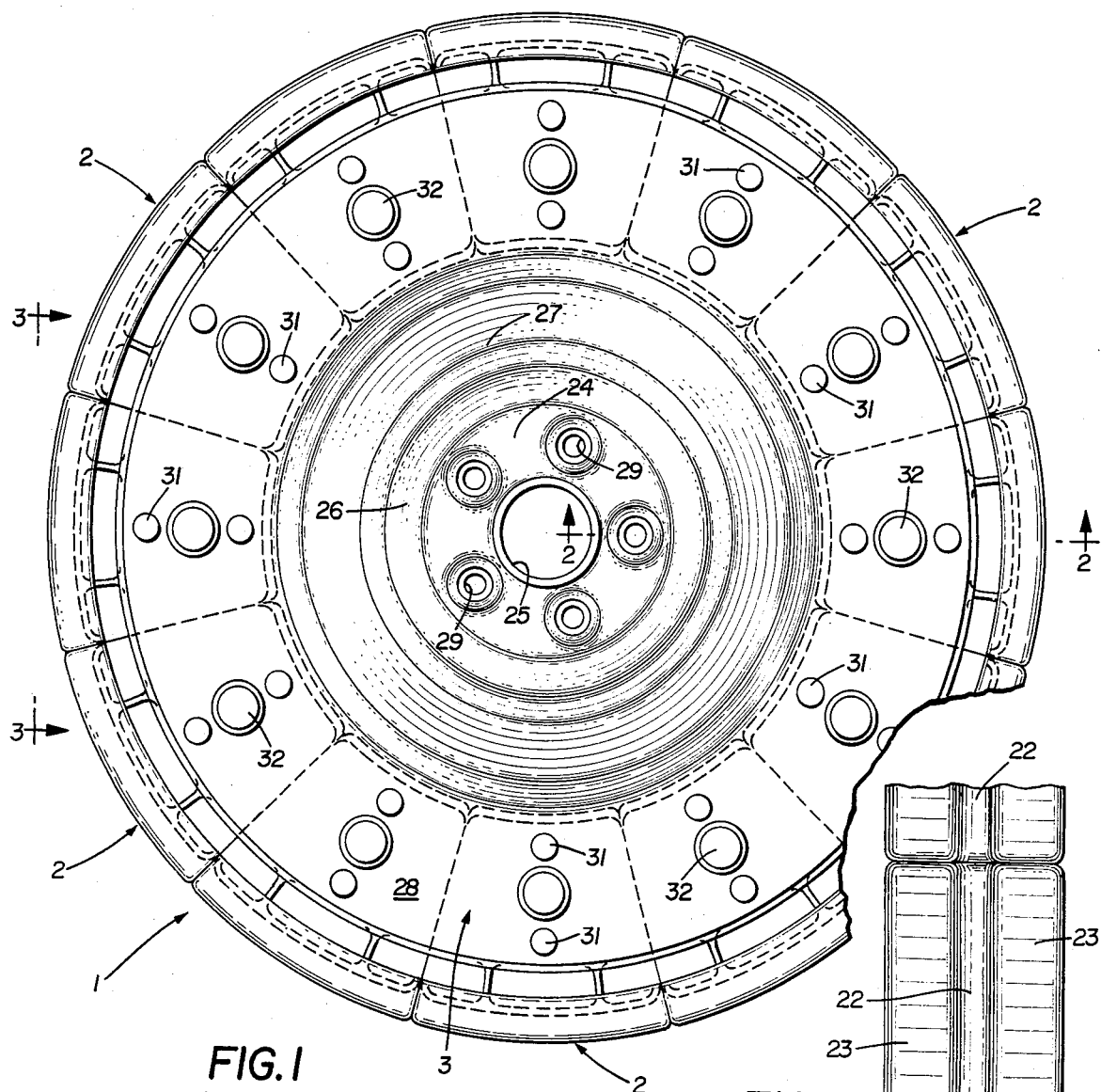
FIG. 1
FIG. 3
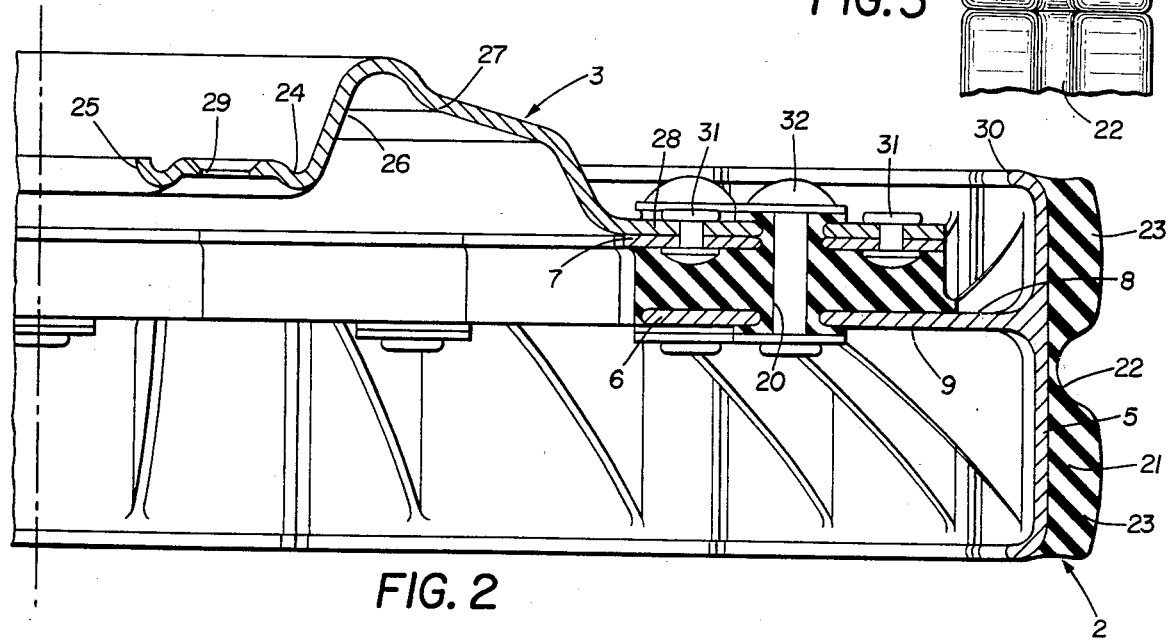
FIG. 2

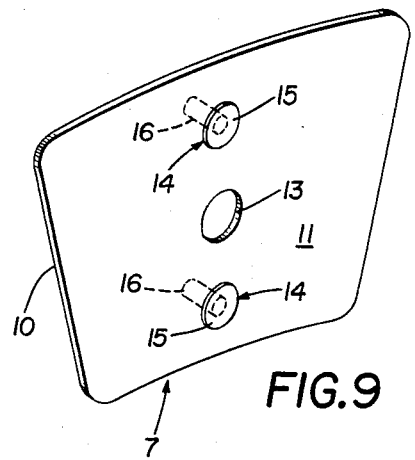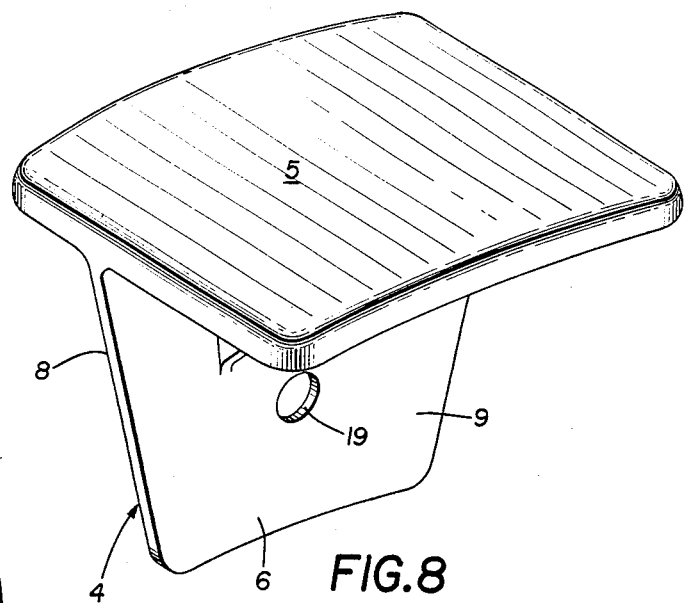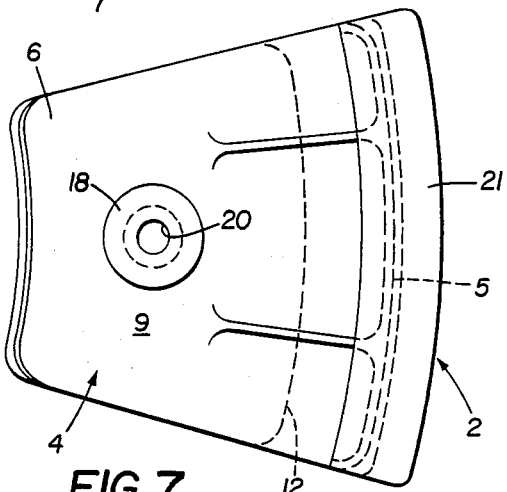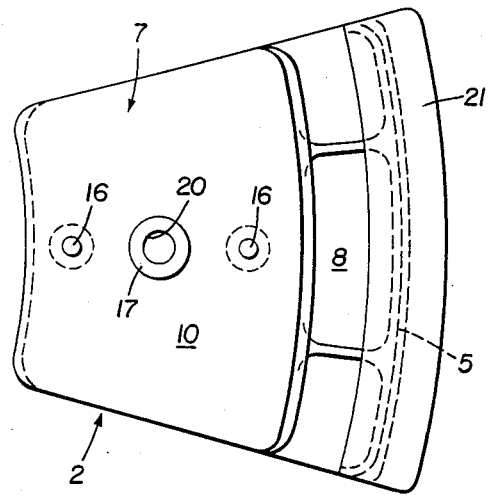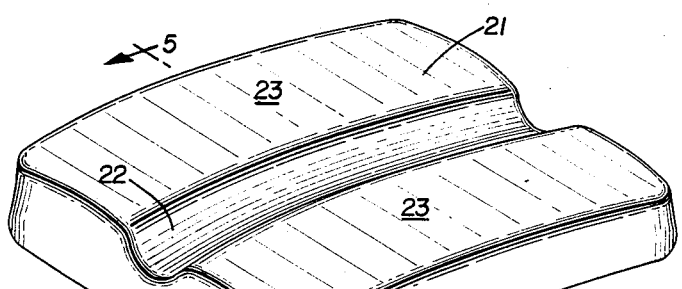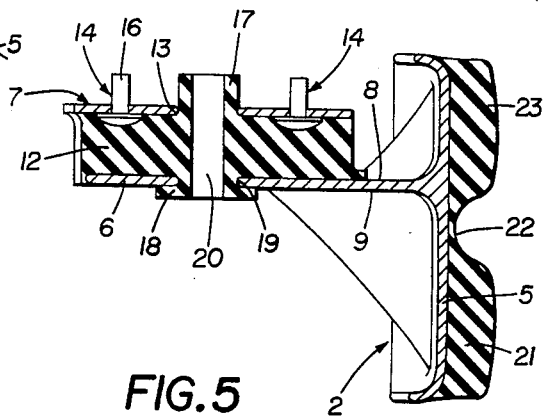

PASSENGER VEHICLE SPARE TIRE CONSTRUCTION

CROSS-REFERENCE TO RELATED PATENT APPLICATION

An alternate spare tire construction is disclosed, described and claimed in our copending application entitled, Spare Tire For Passenger Vehicles, filed Feb. 10, 1984, Ser. No. 578,880.

BACKGROUND OF THE INVENTIONS

1. Field of the Invention

The invention relates to a solid rubber treaded spare tire for passenger vehicles to be supplied as original spare tire equipment for automobiles instead of the usual fifth wheel having a demountable pneumatic tire thereon normally supplied as original equipment for passenger vehicles.

More particularly, the invention relates to a simple spare tire construction composed of outer metal rim segments arranged in a ringlike fashion, and an inner metal hub member to which the ringlike arranged segments are connected. Each segment has a T-shaped cross section with tread rubber vulcanized-bonded to the outer T-head surface. A rubber block is bonded to a surface of each segment T-stem. A small thin sheet metal member is bonded to a portion of the block opposite that block portion which is bonded to the T-stem. The segment sheet metal members each are connected at circumferentially spaced intervals to an inner metal hub member.

Further, the invention relates to a spare tire construction in which the series of segments surrounding the inner hub member, with slight clearance between adjacent segments, forms a substantially continuous circumferential tire rim having a substantially continuous solid rubber tread thereon; and in which the tread rubber, and the rubber blocks connecting the segments and hub member, provide sufficient resilient or cushioning properties so that the spare tire may replace a flat vehicle tire and wheel for necessary highway travel even for considerable distances until the flat tire can be repaired.

Finally, the invention relates to a simple, inexpensive serviceable, reliable, resilient solid rubber treaded spare tire construction which may be manufactured from few components as a unitary structure and included as original spare tire equipment for an automotive passenger vehicle.

2. Description of the Prior Art

The prior art contains examples of resilient wheels having numerous rim and hub member components bolted together wherein outer annular hub portions and inner annular rim portions are clamped together by bolts, etc., with intervening assemblies of numerous rubber pads or washers and separators, sometimes having interengaged socket and projection portions, clamped between spaced annular portions of the rim and hub members. Examples of such prior wheel constructions are shown in Pat. Nos. 1,449,188, 1,684,596 and 2,672,907. The rim members of such constructions have solid rubber tires surrounding their outer peripheries, sometimes removably mounted thereon. The resilient wheels of the types described and shown in said prior patents each have an entremely large number of parts or components bolted and clamped together rendering their constructions, assemblies and maintenance so expensive as to be impractical for occasional use as a spare tire for automotive passenger vehicles.

Another type of spring wheel is shown in U.S. Pat. No. 1,646,991 which also has a large number of components bolted together in assembled form and also has a solid rubber tread portion on the outer periphery of the rim member one form of which is demountable. Several forms of construction are shown. The spring connection between the complicated hub and rim member assemblies in one form is provided by a series of cylindrical rubber plug members having caps at their ends bolted to disklike portions of the rim and hub members of the wheel. In another form the spring connection between the rim and hub members of the wheel consists of a series of spring steel components the ends of which also are clamped in the caps which are bolted to the rim and hub members. Here again the spring wheel construction is so complicated and involves so many different parts assembled and clamped by bolts that the cost of manufacture, assembly, maintenance and adjustment renders the wheel construction impractical for use as a spare tire for automotive passenger vehicles.

Another form of resilient wheel construction is shown in U.S. Pat. No. 2,671,488 wherein a cast metal hub member and a cast metal rim member are assembled by vulcanizing an elastomer to hub and rim annular radial flanges projecting outwardly from the hub member and inwardly from the rim member in overlapped relation, and providing spaced ribs on each of the two flanges directed toward the other and extending into the rubber to increase the bonded area between the rubber and flanges. The outer cylindrical metal surface of the wheel rim contacts the supporting surface over which the wheel rolls when the device supported by the wheel is moved. Such a resilient wheel with cast metal components and an outer cast metal rim surface similarly is impractical for use as a spare tire for an automotive passenger vehicle.

There has been no simple, inexpensive, serviceable spare tire construction known in the art of which we are aware, capable of being manufactured from few thin metal components and bonded rubber to form a unitary structure that can replace expensive automotive wheels having pneumatic tires thereon duplicating the four wheels and tires which support passenger vehicles that traditionally have been part of original equipment for automotive vehicles.

SUMMARY OF THE INVENTION

Objectives of the invention include providing a new spare tire construction for automobiles, to replace the traditional original equipment fifth spare tire wheel and pneumatic tire assembly, that has the same construction as the four wheels and tires with which an auto is equipped, and that is furnished for an automobile; providing such spare tire which is reliable for installation on an automobile to temporarily replace any one of the four wheels with pneumatic tires when one of such tires goes flat until the flat can be repaired, and which may be used for traveling considerable distances until such flat tire repair can be carried out; providing such spare tire construction with a series of simple cast metal T-shaped segments and associated simple small thin sheet metal trapezoid-shaped members, with each segment and associated thin sheet metal member vulcanized-bonded to an intervening rubber block forming an integral segment assembly, with a layer of tread rubber vulcanized-bonded to the T-head outer surface of each segment assembly, and with the series of segment assemblies mounted circumferentially on a sheet metal hub member, provided with an annular recess, to form a unitary spare tire; providing such spare tire construction in which protective means is provided for the segment assemblies to guard against tire collapse in event of failure of a bonded connection between rubber and metal components of said segment assemblies; providing such spare tire construction in which the series of segment assemblies with their articulated rubber block connections with said sheet metal hub member, extending circumferentially around the hub member and with slight clearance between adjacent segment assemblies, forms a substantially continuous circumferential rubber treaded spare tire rim, thereby providing an energy absorbing unitary spare tire; providing such spare tire construction in which the metal components of each of the assemblies may have the tread rubber and rubber blocks vulcanized-bonded thereto in only a single molding operation by usual rubber molding and vulcanizing-bonding procedures in a small vulcanizing mold; providing such new spare tire construction which is inexpensive to manufacture, and reliable to function as a temporary spare tire when called upon to replace a flat pneumatic tire and wheel assembly when such flat tire occurs; and providing a new spare tire construction which achieves the stated objectives in a very reliable manner and, as compared with present wheel and pneumatic tire spare tire equipment, is extremely inexpensive, which eliminates difficulties occurring when finding a fifth present type wheel and pneumatic tire spare tire flat when required as a spare to replace a flat pneumatic tire, which eliminates defects, difficulties and impracticability economic and otherwise characterizing prior art devices, and which solves problems and satisfies needs that long have existed in the field of supplying reliable and inexpensive original equipment spare tires for automobiles.

These and other objectives and advantages may be obtained by the construction stated in general terms as a spare tire of the type in which metal rim and hub members have spaced overlapped flanges joined together by an intervening rubber member between and bonded to said flanges, wherein the improvement comprises: rim means comprising a series of rim segment assemblies each of which includes, a metal segment T-shaped in axial cross section having a cylindrically curved T-head portion and a circumferentially extending, flat T-stem portion projecting radially inward from said T-head portion; a sheet metal segment member thinner than said T-stem portion; a rubber block intervening said T-stem portion and said sheet metal segment member having opposite portions vulcanized-bonded to said T-stem portion and said sheet metal segment member, thereby forming an integral segment assembly; and a layer of tread rubber vulcanized-bonded to the cylindrically curved outer surface of the T-head portion of said T-shaped metal segment; a sheet metal hub member provided with an annular recess; and means mounting said series of rim segment assemblies circumferentially on and extending around said hub member with slight clearance between adjacent segment assemblies to form a substantially continuous rubber treaded unitary spare tire; whereby the rubber blocks in the articulated connections between said rim means and hub member provide for energy absorption of forces to which the spare tire is subjected in use on a passenger vehicle equipped with said spare tire.

BRIEF DESCRIPTION OF THE DRAWINGS

A preferred embodiment of the invention - illustrative of the best mode in which applicants have contemplated applying the principals - is set forth in the following description and shown in the drawings and is particularly and distinctly pointed out and set forth in the appended claims.

FIG. 1 is an outside elevation or front view of one of the new spare tires in which the concepts, features, characteristics and new component relationships of the invention are incorporated;

FIG. 2 is an enlarged sectional view taken on the line 2—2, FIG. 1;

FIG. 3 is a fragmentary edge view of the tire rim looking in the direction of the arrows 3—3, FIG. 1;

FIG. 4 is an enlarged perspective view of one of the rim segment assemblies, a series of which is mounted circumferentially on and extending around the sheet metal hub member of the spare tire;

FIG. 5 is a cross-sectional view of one of the rim segment assemblies taken on the line 5—5, FIG. 4;

FIG. 6 is a front or outer elevation of the rim segment assembly shown in FIGS. 4 and 5;

FIG. 7 is a rear or inner elevation of the rim segment assembly shown in FIGS. 4 to 6;

FIG. 8 is a perspective view of the metal T-shaped component of the rim segment assembly, looking toward the rear of the T-stem; and FIG. 9 is a view similar to FIG. 8 of the sheet metal segment member component of the rim segment assembly.

Similar numerals refer to similar parts throughout the various figures of the drawings.

DESCRIPTION OF THE PREFERRED EMBODIMENT

The new spare tire construction of the invention is indicated generally at 1 in FIG. 1 and includes rim means comprising a series of rim segment assemblies generally indicated at 2, one of said assemblies being best illustrated in FIG. 4. Each tire also includes a sheet metal hub member generally indicated at 3 on which a series of rim segment assemblies 2 is circumferentially mounted as indicated in FIG. 1.

The segments 2 when mounted on the hub member 3 extend completely around the hub member 3, with slight clearance between adjacent rim segment assemblies, to form a substantially continuous rubber treaded unitary spare tire also as shown in FIG. 1.

Each rim segment assembly 2 includes a metal segment, T-shaped in axial cross section, generally indicated at 4 (FIG. 8) having a cylindrically curved T-head portion 5 and a circumferentially extending, flat T-stem portion 6 projecting radially inward from said T-head portion 5.

Each rim segment assembly 2 also includes a sheet metal segment member, generally indicated at 7 (FIG. 9), which is thinner than the T-stem 6 of the T-shaped segment 4.

The metal segments 4 preferably are cast from either steel or aluminum. The wall thickness of the T-head 5 and T-stem 6 portions of segment 4 preferably approximate the thickness of the sheet metal from which the hub member 3 is formed, as shown in FIG. 2.

The T-stem 6 of the segment 4 has a front surface 8 and a rear surface 9. Similarly the sheet metal segment member 7 has a front surface 10 and a rear surface 11.

The segment assembly 2 is formed by joining the metal segment 4 and the sheet metal member 7 with an intervening rubber block 12 by usual molding procedures in a mold wherein the rubber block 12 is vulcanized-bonded to the front surface 8 of the T-stem 6 of the segment 4, and to the rear surface 11 of sheet metal member 7, as shown in FIGS. 4 and 5.

The sheet metal member 7 is formed with a central opening 13 and has two rivets 14 fixed thereto. A head 15 of each rivet 14 preferably is secured by suitable means, such as an adhesive, to the rear surface 11 of member 7 with the rivet shank 16 extending through the member 7 and projecting outward of the front surface 10 of member 7. The member 7, with the rivets 14 fixed thereto, is positioned in the vulcanizing mold so that, at the completion of molding, a rim segment assembly 2 is produced as illustrated particularly in FIGS. 4 and 5.

During molding, rubber in the rubber block 12 extrudes to form a sleevelike portion 17 through the opening 13 in member 7, extending outward from the front surface 10 of the rim segment assembly 2 as shown in FIGS. 4 and 5.

Rubber from block 12 also forms a washerlike portion 18 enclosing an opening 19 in the T-stem 6 of metal segment 4 (FIG. 5). The block 12 has a cylindrical opening 20 extending through the block, defined at its ends by the sleevelike portion 17 and washerlike portion 18 (FIG. 5). The cylindrical opening 20 is formed during molding by a core provided in the mold.

The segment 4 and the sheet metal member 7 each is described as having a generally trapezoidal shape, even though outer and inner edges thereof are arcuately curved as shown in FIGS. 4, 6, 7, 8 and 9.

Solid tread rubber 21 also is vulcanized-bonded to the outer surface of the T-heads of segment 4, preferably formed with a central groove 22. Thus when the series of rim segment assemblies 2 is mounted on the hub member 3, as shown in FIG. 1, a central recess or groove is formed by grooves 22 extending entirely circumferentially around the tire 1 (FIG. 3). This central circumferential groove divides the tire tread into two ribs 23, as shown in FIG. 2.

Preferably the tread rubber 21 and rubber blocks 12 are formed of usual automotive tire compositions of either natural or styrene butadiene rubber. The same rubber composition preferaby is used for both tread rubber 21 and rubber blocks 12 to simplify the vulcanizing procedure requirements.

As indicated, the vulcanizing and bonding may be carried out in a small typical mold cavity heated to vulcanizing temperature, in accordance with well-known molding procedures for vulcanized rubber. The rubber is bonded at the same time to the T-stem of the T-shaped segment 4 and to the thin sheet metal member 7 to join these components; while the tread rubber similarly is bonded to the T-head 5 of segment 4.

One of the advantageous features of the new concepts of the invention involves the relatively small size of the mold cavity required for producing the rim segment assemblies 2. This eliminates the requirement for a molding operation in a mold cavity large enough to join members of an entire spare tire, as is required in our companion copending application Ser. No. 578,880, filed Feb. 10, 1984. In this manner the cost of manufacture of the spare tire 1 is further reduced thereby satisfying one of the objectives of the invention.

The sheet metal hub member 3 has a cross-sectional shape best shown in FIG. 2. Its cross-sectional contour is formed by an inner annular portion 24 in which a central hub opening 25 is formed. An annular recess 26 surrounds the inner annular portion 24, the recess 26 being formed by an annular outwardly deformed or bulged wall 27 which terminates in an outer peripheral annular flange 28.

When the components of the spare tire 1 are assembled as shown in FIGS. 1 and 2, the annular recess 26 provides clearance for brake calipers on an axle of a vehicle on which the hub member is mounted by usual wheel mounting bolts, not shown, on the auto to which the hub member 3 may be bolted through mounting bolt holes 29 that are formed in the inner annular portion 24 of the hub member. Thus, the hub member annular recess 26 bulges axially outwardly beyond the axial location of the front edges 30 of the T-heads of the tire rim segments 4, as shown in FIG. 2.

The sheet metal from which the hub member 3 is formed ordinarily should be $\frac{1}{8}$ inch thick sheet metal for many spare tire sizes. However, small diameter spare tires may require only lighter than $\frac{1}{8}$ inch thick sheet metal, and larger diameter spare tires may desirably be formed of heavier than $\frac{1}{8}$ inch thick sheet metal. Thus, the metal thickness may vary from 1/16 inch to 3/16 inch thick sheet metal.

The thin sheet metal segments 7 are provided primarily for locating metal members spaced from the T-stems of the segments 4 between which the rubber blocks 12 are bonded to the metal members. Thus, the thickness of the sheet metal from which the segments 7 are formed, may be considerably thinner than the thickness of the hub member sheet metal.

Each rim segment assembly 2 is mounted on the outer peripheral flange 28 of the hub member by telescoping the rivet shanks 16 (FIG. 5) through openings formed in the hub member 3, and by then riveting the outer ends of the shanks 16, as indicated at 31, to complete the mounting of rim assembly 2 on the hub member 3. In this manner the series of rim segment assemblies 2 is mounted on the hub member 3 to complete the tire rim.

Referring to FIG. 2, a double headed protective member 32, either a rivet or a bolt, is located to extend through the cylindrical opening 20 in the rubber block 12 and to engage the hub flange 28 and the T-stem 6 of each rim segment assembly 2 to guard against tire collapse in event of failure of a bonded connection between rubber and metal components of said segment assemblies.

The openings in the metal members through which the protective members 32 extend, are enlarged as shown, so that rubber portions are located between the protective members 32 and the metal members of the tire. This permits proper functioning of the rubber blocks 12 forming the articulated connections between the rim and hub members to absorb energy of forces to which the spare tire is subjected in use on a passenger vehicle equipped with the new spare tires 1.

Regardless of the sheet metal thicknesses of the metal members in the ranges indicated, the rubber blocks 12 in each rim segment assembly 2 bonded to metal members should have an axial thickness of at least one inch. The radial and circumferential dimensions or thicknesses of each rubber block 12 are considerably greater than one inch, as is clear by comparing these thicknesses with the axial thickness of the block 12 in FIG. 4 where the trapezoidal shape of the block in the assembly is illustrated.

These radial and circumferential dimensions of the generally trapezoidal shape of the rubber blocks 12 may vary depending upon the size and diameter of the spare tire. However, when twelve rim segment assemblies 2 comprise the series of assemblies illustrated in FIG. 1, each segment occupies 30 degrees of the tire circumference. Thus, the circumferential and radial dimensions of the trapezoidal shape of the rubber blocks 12 are in excess of three times the one inch axial block thickness, that is, in excess of three inches.

The rubber blocks 12 distort and absorb energy produced by forces acting from any direction upon each rim segment assembly 2 independently of the other segment assemblies 2 mounted on the hub member 3 during movement of an auto on which the spare tire 1 is mounted. This characteristic of the spare tire of the invention thus provides a slight cushioning effect when the tire travels over rough or bumpy roads.

Accordingly, the new spare tire construction shown and described and its particular features and the coordinated relationships between the individual rim segment assemblies and the low cost of manufacture of the tire components, satisfy the stated objectives, overcome problems and defects that characterize prior art structures, enable elimination of high cost unreliable spare tire pneumatic tire and wheel assemblies, and satisfy needs that have long existed in the art.

In the foregoing description, certain terms have been used for brevity, clearness and understanding but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, principles and cooperative relationships of the new structures, and the advantageous, new and useful results obtained, the new structures, devices, components, elements, arrangements, parts, combinations and relationships are set forth in the appended claims.

We claim:

1. A spare tire of the type in which metal rim and hub members have spaced overlapped flanges joined together by an intervening rubber member between and bonded to said flanges, wherein the improvement comprises:
   (a) rim means comprising a series of rim segment assemblies each of which includes,
      (1) a metal segment T-shaped in axial cross section having a cylindrically curved T-head portion and a circumferentially extending, flat T-stem portion projecting radially inward from said T-head portion;
      (2) a sheet metal segment member thinner than said T-stem portion;
      (3) a rubber block intervening said T-stem portion and said sheet metal segment member having opposite portions vulcanized-bonded to said T-stem portion and said sheet metal segment member, thereby forming an integral segment assembly; and
      (4) a layer of tread rubber vulcanized-bonded to the cylindrically curved outer surface of the T-head portion of said T-shaped metal segment;
   (b) a sheet metal hub member provided with an annular recess; and
   (c) means mounting said series of rim segment assemblies circumferentially on and extending around said hub member with slight clearance between adjacent segment assemblies to form a substantially continuous rubber-treaded unitary spare tire;
   (d) whereby the rubber blocks between said rim means and hub member provide for energy absorption of forces to which the spare tire is subjected in use on a passenger vehicle equipped with said spare tire.

2. The spare tire defined in claim 1 in which a double-headed protective member extends through the rubber block and loosely through enlarged openings in the T-stem portion and sheet metal segment member of each rim segment assembly and through an enlarged opening in said sheet metal hub member to guard against tire collapse in event of failure of a bonded connection between rubber and metal components of said segment assemblies.

3. The spare tire defined in claim 1 in which the T-shaped metal segment is formed of cast metal.

4. The spare tire defined in claim 3 in which the cast metal is steel.

5. The spare tire defined in claim 3 in which the cast metal is aluminum.

6. The spare tire defined in claim 1 in which the T-stem of each T-shaped metal segment projects radially inwardly from the T-head portion of said segment axially closer to the front axial edge of the T-head than to the rear edge of said T-head; and in which the hub member annular recess bulges outward beyond the front axial edge of the T-head to provide clearance for the brake calipers of a vehicle on which the spare tire is mounted.

7. The spare tire defined in claim 1 in which the sheet metal segment member of each rim segment assembly is generally trapezoidal in shape; and in which the rubber block intervening and bonded to said T-stem portion and said sheet metal segment member is similarly generally trapezoidal-shaped in radial cross section.

8. The spare tire defined in claim 1 in which the means mounting each rim segment assembly on said sheet metal hub member comprises rivet means joining the sheet metal segment member of each rim segment assembly to said sheet metal hub member.

9. The spare tire defined in claim 1 in which the axial thickness of the rubber block is at least one inch.

10. The spare tire defined in claim 9 in which the radial and circumferential dimensions of the rubber block are in excess of one inch.

11. The spare tire defined in claim 9 in which the radial and circumferential dimensions of the rubber block are each at least three inches.

* * * * *